May 22, 1923.
G. W. WHEELWRIGHT
1,455,979
MOISTUREPROOF FIBER CONTAINER
Filed April 18, 1919
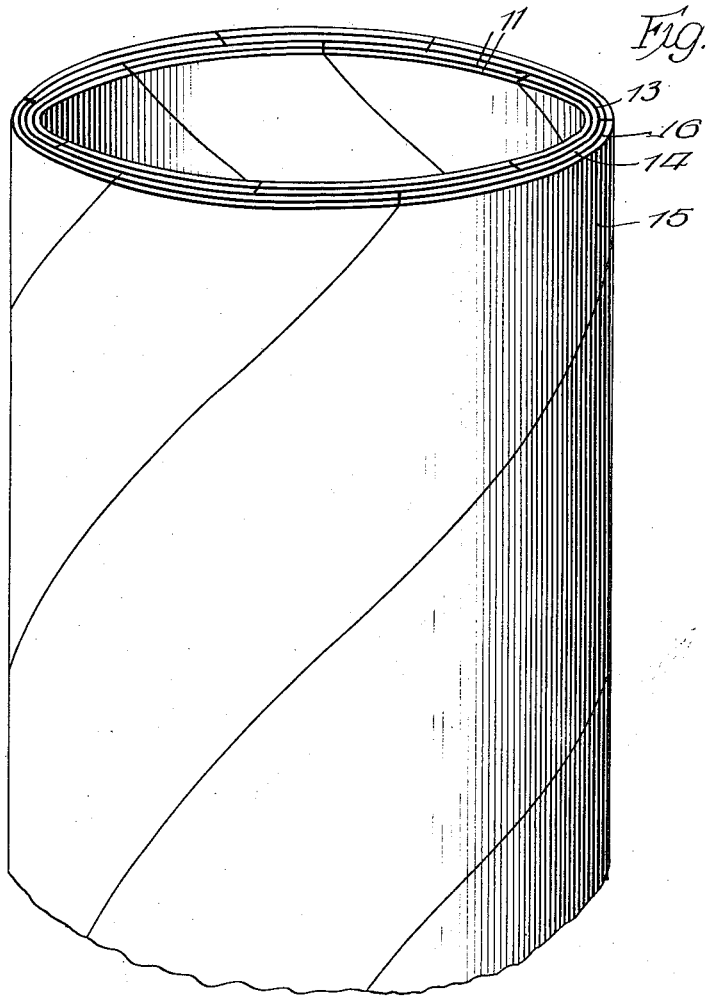
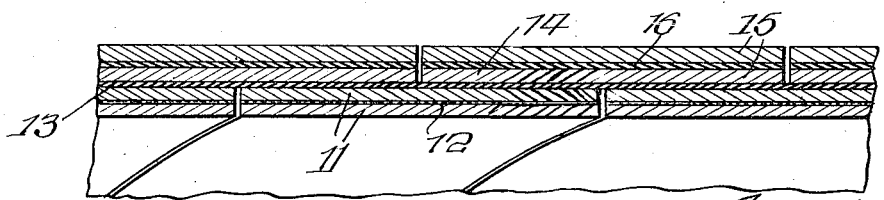

Patented May 22, 1923.

1,455,979

UNITED STATES PATENT OFFICE.

GEORGE W. WHEELWRIGHT, OF BLOOMFIELD, NEW JERSEY, ASSIGNOR TO AMERICAN CAN COMPANY, OF NEW YORK, N. Y., A CORPORATION OF NEW JERSEY.

MOISTUREPROOF FIBER CONTAINER.

Application filed April 18, 1919. Serial No. 290,958.

*To all whom it may concern:*

Be it known that I, GEORGE W. WHEELWRIGHT, a citizen of the United States, residing in Bloomfield, in the county of Essex and State of New Jersey, have invented a new and useful Improvement in Moistureproof Fiber Containers, of which the following is a specification.

This invention relates in general to moisture-proof containers and has more particular reference to fiber containers of this character designed to provide completely moisture-proof bodies.

The purpose of the invention is the provision of a completely moisture-proof body of two or more plies; the portions of the body being so constructed that there need be no overlapping of the material; joining edges resting in abutment each with the other.

Another object of the invention is the provision of such a construction as may be provided upon a spiral tube winding machine.

Numerous other objects and advantages of the invention will be apparent as it is better understood from the following description when considered in connection with the accompanying drawings which illustrate a present preferred embodiment of my invention.

Referring to the drawings,

Figure 1 is a perspective view of a container body embodying my present invention.

Fig. 2 is a partial section taken longitudinally thereof.

For the purpose of illustrating my invention I have shown on the drawing a container body comprising a carcass of two or more plies of cardboard or paper 11 suitably connected together by glue or other suitable cement 12. These plies are provided in strip formation and are spirally wound as may be seen by comparing Figs. 1 and 2. Upon this carcass is provided a continuous layer or ply of fused cement 13 extending over the wound carcass formed as just described and upon this is positioned a ply 14 of fibrous material which may if desired be composed of two layers 15 held in turn together by a layer of fused cement 16; this material being also of strip formation and spirally wound upon the carcass. Both the strip of the carcass and the strip of the outer ply may have the edges abutting without any danger of leakage of moisture by reason of the continuity of the ply of fused cement 13; this ply extending immediately behind the abutting edges, as may be seen by viewing Fig. 2, and preventing any moisture entering into the container through said abutting edges.

My container body is in effect composite being composed of an inner body formed of plies 11, 11; an outer body formed of plies 15, 15 united to each other independently of the plies 11, 11; and a continuous layer 13 of fused cement enveloping the inner body so as to make it impervious and uniting the outer body to the inner body.

It is thought that the invention and many of its attendant advantages will be understood from the foregoing description, and it will be apparent that various changes may be made in the form, construction and arrangement of the parts without departing from the spirit and scope of the invention defined in the claim or sacrificing any of its material advantages, the form hereinbefore described being merely a preferred embodiment thereof.

I claim—

A composite body for a moisture-proof container consisting of an inner body formed of two plies of paper-like material spirally wound and united together, an outer body formed of two plies of paper-like material spirally wound independently of the winding of said inner body, a fused cement uniting the outer plies of said outer body, and a cylindrically continuous and impervious layer of fused cement entirely enclosing the sides of said inner body and permanently uniting said outer body to said inner body.

Signed in the presence of two subscribing witnesses.

GEORGE W. WHEELWRIGHT.

Witnesses:
D. F. MENNIS,
J. DREYFUSS.